United States Patent [19]

Titchmarsh

[11] 4,217,123

[45] Aug. 12, 1980

[54] DOUBLE CRUCIBLE METHOD OF OPTICAL FIBER MANUFACTURE

[75] Inventor: James G. Titchmarsh, Harlow, England

[73] Assignee: International Standard Electric Corporation, New York, N.Y.

[21] Appl. No.: 926,052

[22] Filed: Jul. 19, 1978

Related U.S. Application Data

[63] Continuation of Ser. No. 764,308, Jan. 31, 1977, abandoned.

[30] Foreign Application Priority Data

Feb. 3, 1976 [GB] United Kingdom .............. 04176/76

[51] Int. Cl.² ............................................ C03B 37/02
[52] U.S. Cl. ....................................... 65/3 A; 65/121
[58] Field of Search ....................... 65/3 A, 13, 121

[56] References Cited

U.S. PATENT DOCUMENTS

| | | | |
|---|---|---|---|
| 3,288,583 | 11/1966 | Sheldon | 65/3 A X |
| 3,726,656 | 4/1973 | Reid et al. | 65/121 X |

FOREIGN PATENT DOCUMENTS

| | | | |
|---|---|---|---|
| 2746418 | 4/1976 | Fed. Rep. of Germany | 65/3 A |
| 2317238 | 3/1977 | France | 65/3 A |
| 4830126 | 9/1963 | Japan | 65/3 A |

Primary Examiner—Richard V. Fisher
Attorney, Agent, or Firm—John T. O'Halloran; Peter C. Van Der Sluys

[57] ABSTRACT

A method for forming optical fibres from a double crucible wherein one crucible supplies the core material and the other crucible supplies the cladding material. The two melts are supplied in a continuous process to insure a constant core to cladding diameter ratio.

3 Claims, 3 Drawing Figures

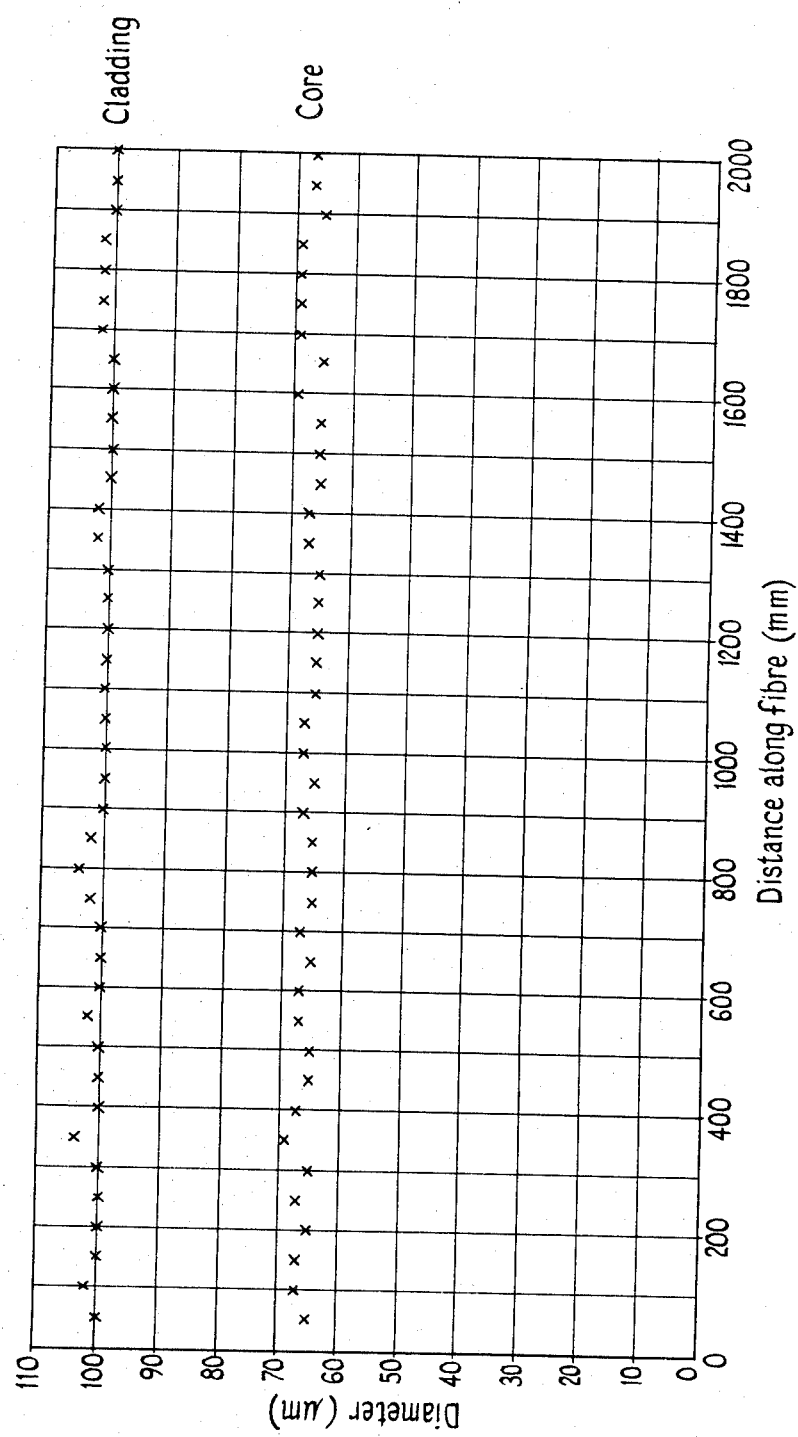

DOUBLE CRUCIBLE METHOD OF OPTICAL FIBER MANUFACTURE

This is a continuation of application Ser. No. 764,308, filed Jan. 31, 1977, now abandoned.

FIELD OF THE INVENTION

This invention relates to glass optical fibre manufacture.

BACKGROUND OF THE INVENTION

In the double crucible method of making glass fibres two concentric bushings, typically of platinum, are furnished with molten core and cladding glasses, and fibre is drawn from the outfall of the nozzles at the bottom of the bushings. If the bushings are held at constant temperature and in fixed spatial relationship with each other, then the ratio of core to cladding diameters will be a function of core and cladding glass melt levels. If the bushings are not continuously replenished, then the levels change as the bushings drain, and in general this will cause the core to cladding diameter ratio to change. It is possible under certain circumstances to arrange the starting conditions so that the levels fall 'in step' in such a way that the core to cladding diameter ratio remains constant. However, a significant disadvantage is that the fibre is produced in batches. Constant core to cladding ratio can in principle be obtained in a continuous process in which the melts are continuously topped up to maintain their levels constant. A difficulty with this approach is the measurement of the melt levels.

SUMMARY OF THE INVENTION

According to the present invention there is provided a method of making optical fibre using a double bushing wherein fibre is pulled from the bushings outfall at a rate ensuring a meniscus in the glass at the outfall and wherein the melts are replenished at constant rates predetermined without reference to the melt levels.

The invention also resides in apparatus for making glass optical fibre including a double bushing provided with glass constant feed means for supplying glass to the inner and to the outer bushings at constant rates.

The invention avoids the use of melt level detectors and relies instead upon the fact that if glass is added to a melt in a bushing at a constant rate, the melt level will adjust itself until the hydrostatic head is such as to produce a flow exactly matching the feed rate. In a system regulated by holding the melt levels constant the resulting core to cladding diameter ratio is a complex function of hydrostatic heads, viscosities, and rheological conductances, but in a system regulated in accordance with the teachings of the present invention the core to cladding diameter ratio is determined by the feed rates alone and is independent of viscosity and rheological conductance. Moreover the volumetric feed rate ratio and the equilibrium core to cladding diameter ratio are related by a simple quadratic function.

If constant cross-section glass cane is available as feedstock for replenishing the melts then the feeds may be provided by lowering the canes into the melts at constant rates. When constant cross-section glass canes are not available a preferred method of obtaining constant feed rates is to suspend the feedstock from a load sensing device forming part of a control loop controlling the lowering of the sensing device such that it registers a linearly decreasing load. Whichever type of feed means is employed, it will need to incorporate a standby arrangement if the double bushing is to be operated continuously in order to allow the changeover of feed from one piece of feedstock to another.

An embodiment of the invention will now be described with reference to the accompanying drawings in which:

BRIEF DESCRIPTION OF THE DRAWINGS

FIGS. 2 and 3 are graphical representations of measurements of core and cladding diameters along lengths of fibre drawn from the double bushing of FIG. 1.

DESCRIPTION OF THE PREFERRED EMBODIMENTS

Figure 1:
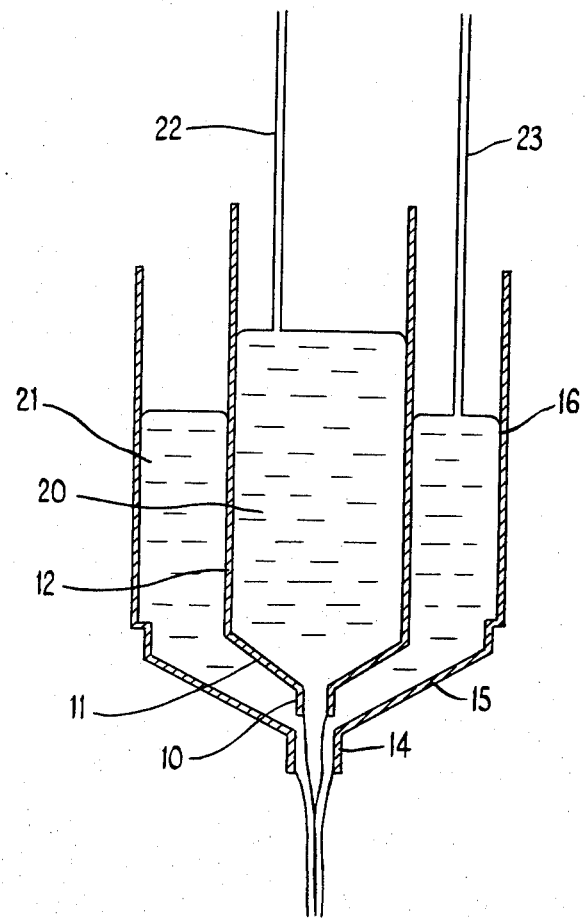
FIG. 1 is a sectional view of a double bushing continuously fed with two compositions of glass cane at constant rates according to the invention.

Referring to FIG. 1, an inner bushing made of 0.5 mm thick platinum has a 3.7 mm diameter nozzle 10, which is 4.0 mm long. Above this nozzle, there is a sharply tapering portion 11, which is 8.0 mm high, linking the nozzle with a gradually tapering reservoir portion 12 which is 69 mm high and in which the diameter decreases from 29.2 mm at the top of the reservoir to 27.2 mm at the bottom.

The inner bushing is held concentrically within an outer bushing having a nozzle 14. This outer bushing is also made of 0.5 mm thick platinum. The tip of the inner bushing nozzle 10 is held 2 mm above the top of the outer bushing nozzle 14 which is 5 mm in diameter and 8 mm in length. Above the outer bushing nozzle is a sharply tapering portion 15, which is 17 mm high, linking the nozzle with a reservoir 16. The reservoir tapers gradually from an internal diameter of 62 mm at the top to 60 mm immediately above a step located 6 mm above the bottom of the reservoir. At this step the internal diameter is reduced to 56.3 mm. The total height of the reservoir 16 is 56 mm. These dimensions have been quoted to give an idea of scale and are not to be considered critical. The tapers on the reservoirs were merely provided in order to facilitate their removal from mandrels in the course of manufacture. The step in the outer bushing reservoir was originally included to locate a web for locating the bottom of the inner crucible centrally within the outer crucible but it was then found not necessary to use this web as adequate concentricity was obtained when the bushings were held only at their tops.

The inner bushing contains a quantity 20 of core glass while the outer bushing contains a quantity 21 of a cladding glass having a refractive index slightly less than that of the core glass. Preferably the other physical parameters are closely matched so as to ensure good compatability. A typical pair of compatible glasses consists of 23% $Na_2O$, 40% $B_2O_3$, 35% $SiO_2$ by weight for the core glass, and 27% $Na_2O$, 13% $B_2O_3$, 60% $SiO_2$ by weight for the cladding glass. The double bushing is contained in a furnace (not shown), which, for these particular glasses is maintained at about 800° C. At this temperature the glasses are molten and flow out of the double bushing. The two melts are replenished by the feeding in at constant rate of canes 22 and 23 of core and cladding glass respectively.

If canes of constant cross-section are available they are clamped to the carriages of lead screws (not shown) driven by constant speed motors (not shown). With canes having cross-sections of a few square millimeters the feed rates typically lie in the range of 1 to 10 millimeters per minute. The glass issuing from the double bushing is under these circumstances pulled into fibre by a take-up drum (not shown) typically driven at a rim speed of between ten and twenty meters per minute. The choice of take-up speed controls the fibre size, but has substantially no effect upon the flow of glass out of the double bushing provided that the speed is fast enough to produce a meniscus at the outfall of the double bushing. If the take up speed were too small to do this, the tendency to form drops would tend to impede the flow from the nozzle 10 of the outer bushing.

Figure 2:
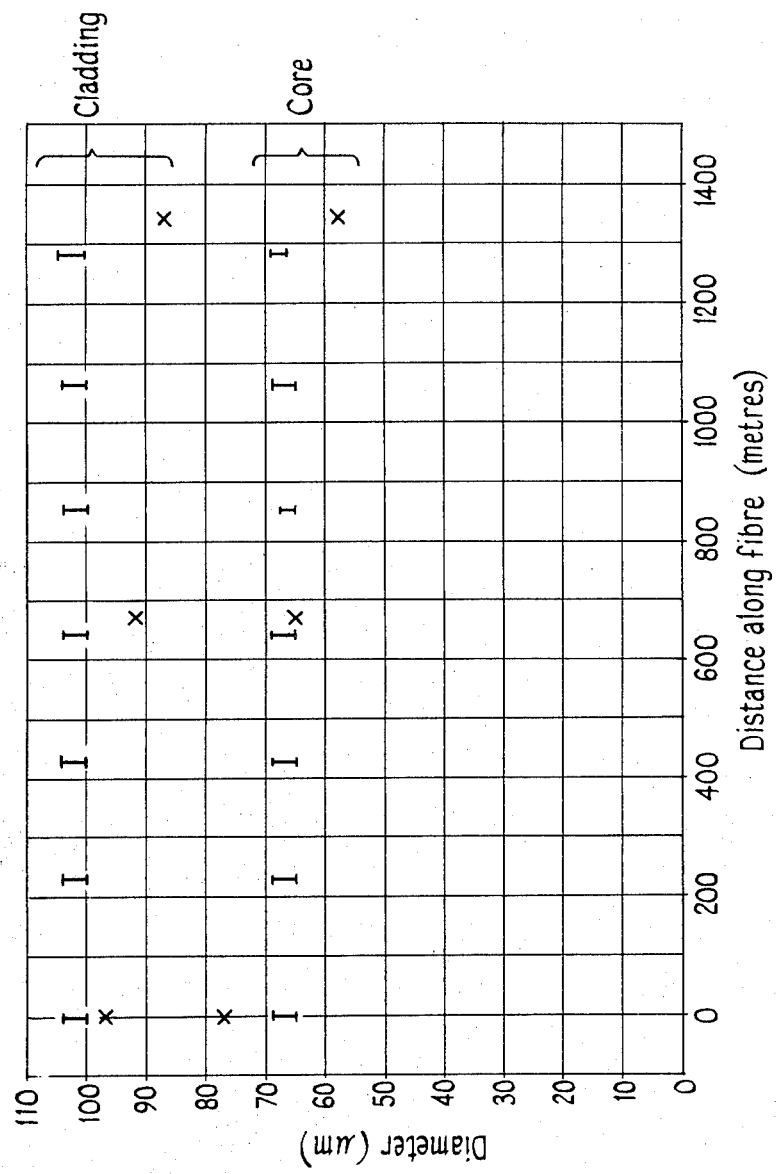

In a typical example of operation a core glass cane having a diameter of 3.7 mm was lowered into the core glass melt at 10 mm per minute, while cladding glass cane having a diameter of 5.3 mm was lowered into the cladding at the rate of 3.6 mm per minute. Under these conditions 1½ km of fibre were pulled. The dimensions of the resulting fibre were measured at frequent intervals along the fibre. The core diameter was found to vary within the limits of 69 to 75 mm and the cladding diameter between the limits of 96 to 102 mm. The magnitude of scatter in sizes was somewhat improved in a second run using the same feed rates but slightly different sized canes having better uniformity of cross-section. In this second run the measured scatter in fibre core and cladding diameters was reduced to ±2 mm. These measurements, and their spread, are displayed in FIG. 2 where each vertical bar represents the spread in a set of 40 measurements made at regular intervals over a 2 meter length. The results of one of these sets of 40 measurements are shown by way of example in FIG. 3. For the purposes of comparison, FIG. 2 also includes plots of measurements obtained when fibre was drawn from the double bushing without its melt being replenished. These measurements are indicated by crosses on FIG. 2, and show how the core diameter and the cladding diameter both diminish, and result in a change of core to cladding diameter ratio from about 0.88 to about 0.66.

If core and cladding glass canes having constant cross-section are not available then the cane feed mechanism has to be modified. A preferred method of providing the cane feed in this instance is to suspend the cane from a load sensing device providing an output that provides a control signal in a feedback loop controlling the speed of the motor. The feedback loop is set up so as to cause the load sensed by the load sensing device to decrease at a predetermined constant rate. The principle of operation is that as the bottom end of the cane melts away on coming into contact with the melt surface the loss of weight of suspended cane equals the mass melted away.

It is to be understood that the foregoing description of specific examples of this invention is made by way of example only and is not to be considered as a limitation on its scope.

I claim:
1. A method of making an optical fiber, using a double crucible containing the core and cladding glass melts said crucibles having aligned bushings, comprising the steps of:
   pulling the fiber from the glass outfall of the bushings at a rate ensuring a meniscus in the glass at the outfall; and
   replenishing the core and cladding glass melts at constant predetermined rates selected to achieve a predetermined fiber core diameter to fiber cladding diameter ratio, whereby the levels of the glass melts in the crucibles will adjust themselves to establish hydrostatic heads in the crucibles sufficient to produce glass melt flow rates through the bushings that exactly match the predetermined glass melt replenishing rates, and the core-to-cladding diameter ratio of the fiber is determined by the replenishing rates and is independent of viscosity and rheological conductance of the glass melts.

2. A method of controlling the core-to-cladding diameter ratio of an optical fiber manufactured using the double crucible technique wherein the crucibles have aligned bushings at a lowermost portion thereof and said crucibles contain core and cladding molten glass materials, the method comprising the steps of:
   pulling the fiber from the glass outfall of the bushings at a rate sufficient to ensure the formation of a meniscus in the glass at the outfall; and
   replenishing the molten core and cladding glass materials at predetermined constant rates selected to achieve a desired core-to-cladding diameter ratio, whereby the core-to-cladding diameter ratio is determined by the replenishment rates and is independent of viscosity and rheological conductance of the molten glass materials.

3. A method of making an optical fiber, using the double crucible technique, wherein the crucibles have aligned bushings at a lowermost portion thereof and said crucibles contain molten core and cladding glass materials, comprising the steps of:
   pulling the fiber from the glass outfall of the bushings at a rate sufficient to ensure the formation of a meniscus in the glass at the outfall; and
   controlling the core-to-cladding diameter ratio of the optical fiber solely by replenishing the molten core and cladding glass materials at predetermined constant rates selected to achieve a desired ratio, whereby the levels of the molten glass materials in the crucibles reach an equilibrium level at which hydrostatic heads are established in the crucibles sufficient to produce flow rates of the molten glass materials through the bushings that exactly match the predetermined constant replenishment rates independently of the viscosities and rheological conductances of the molten glass materials.

* * * * *